United States Patent
Vasseur et al.

(10) Patent No.: US 9,652,720 B2
(45) Date of Patent: May 16, 2017

(54) TRIGGERING ON-THE-FLY REQUESTS FOR SUPERVISED LEARNING OF LEARNING MACHINES

(71) Applicant: Cisco Technology, Inc., San Jose, CA (US)

(72) Inventors: Jean-Philippe Vasseur, Saint Martin d'Uriage (FR); Grégory Mermoud, Veyras (CH); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 428 days.

(21) Appl. No.: 13/937,705

(22) Filed: Jul. 9, 2013

(65) Prior Publication Data
US 2014/0222728 A1 Aug. 7, 2014

Related U.S. Application Data

(60) Provisional application No. 61/761,127, filed on Feb. 5, 2013.

(51) Int. Cl.
| | | |
|---|---|---|
| G06N 99/00 | (2010.01) | |
| H04W 4/00 | (2009.01) | |
| H04L 29/08 | (2006.01) | |

(52) U.S. Cl.
CPC .......... *G06N 99/005* (2013.01); *H04L 67/12* (2013.01); *H04W 4/005* (2013.01)

(58) Field of Classification Search
None
See application file for complete search history.

(56) References Cited

U.S. PATENT DOCUMENTS

| | | | |
|---|---|---|---|
| 5,109,483 A | 4/1992 | Baratz et al. | |
| 5,394,394 A | 2/1995 | Crowther et al. | |
| 7,039,014 B1 | 5/2006 | Krishnamurthy et al. | |
| 7,930,260 B2 * | 4/2011 | Deo | G06K 9/6298 |
| | | | 706/20 |
| 2007/0280102 A1 | 12/2007 | Vasseur et al. | |
| 2008/0101259 A1 | 5/2008 | Bryant et al. | |
| 2011/0099193 A1 * | 4/2011 | Jensen | G06F 17/30303 |
| | | | 707/769 |

OTHER PUBLICATIONS

Anantavrasilp, Isara. Supervised Machine Learning Assisted Real-Time Flow Classification System. Diss. Technische Universität München, 2010.*

(Continued)

*Primary Examiner* — Kakali Chaki
*Assistant Examiner* — Daniel Pellett
(74) *Attorney, Agent, or Firm* — Parker Ibrahim & Berg LLC; James M. Behmke; Stephen D. LeBarron (57) ABSTRACT

In one embodiment, network data is received at a Learning Machine (LM) in a network. It is determined whether the LM recognizes the received network data based on information available to the LM. When the LM fails to recognize the received network data: a connection to a central management node is established, a request is sent for information relating to the unrecognized network data to the central management node, and information is received from the central management node in response to the request. The received information assists the LM in recognizing the unrecognized network data.

20 Claims, 5 Drawing Sheets

(56) References Cited

OTHER PUBLICATIONS

Bernaille, Laurent, et al. "Traffic classification on the fly." ACM SIGCOMM Computer Communication Review 36.2 (2006): 23-26.*
Wang, Yu, and Shun-Zheng Yu. "Supervised learning real-time traffic classifiers." Journal of Networks 4.7 (2009): 622-629.*
Rabie, Sameh, Andrew Rau-Chaplin, and Taro Shibahara. "DAD: a real-time expert system for monitoring of data packet networks." IEEE Network 2.5 (1988): 29-34.*
Cohn, David, Rich Caruana, and Andrew McCallum. "Semi-supervised clustering with user feedback." Constrained Clustering: Advances in Algorithms, Theory, and Applications 4.1 (2003): 17-32.*
Stumpf, Simone, et al. "Toward harnessing user feedback for machine learning." Proceedings of the 12th international conference on Intelligent user interfaces. ACM, 2007.*
Breazeal, Andrea Thomaz Cynthia. "Reinforcement Learning with Human Teachers." (2007).*
Griffith, Shane, et al. "Policy shaping: Integrating human feedback with reinforcement learning." Advances in Neural Information Processing Systems. 2013.*
Vasseur, et al., "Learning Machine Based Detection of Abnormal Network Performance", U.S. Appl. No. 61/761,117, filed Feb. 5, 2013, 39 pages, U.S. Patent and Trademark Office.
Vasseur, et al., "Triggering On-The-Fly Requests for Supervised Learning of Learning Machines", U.S. Appl. No. 61/761,127, filed Feb. 5, 2013, 24 pages, U.S. Patent and Trademark Office.
Winter, et al., "RPL: IPv6 Routing Protocol for Low-Power and Lossy Networks", Request for Comments 6550, Mar. 2012, 157 pages, Internet Engineering Task Force Trust.

* cited by examiner

REGRESSION USING VBLS-RVM, THE CORRESPONDING CONFIDENCE INTERVAL IS DEPICTED USING THE SHADED AREA. ANY POINT BEYOND THIS SHADED AREA CAN BE CONSIDERED AS AN OUTLIER, AND WOULD THEREFORE REQUIRE A VALIDATION FROM AN EXPERT BEFORE BEING INCORPORATED INTO THE MODEL.

FIG. 5

TRIGGERING ON-THE-FLY REQUESTS FOR SUPERVISED LEARNING OF LEARNING MACHINES

RELATED APPLICATION

The present invention claims priority to U.S. Provisional Application Ser. No. 61/761,127, filed Feb. 5, 2013, entitled "TRIGGERING ON-THE-FLY REQUESTS FOR SUPERVISED LEARNING OF LEARNING MACHINES", by Vasseur, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an is order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems is that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, techniques are shown and described relating to triggering on-the-fly requests for supervised learning of learning machines. In one embodiment, network data is received at a Learning Machine (LM) in a network. It is determined whether the LM recognizes the received network data based on information available to the LM. When the LM fails to recognize the received network data: a connection to a central management node is established, a request is sent for information relating to the unrecognized network data to the central management node, and information is received from the central management node in response to the request. The received information assists the LM in recognizing the unrecognized network data.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus.

WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
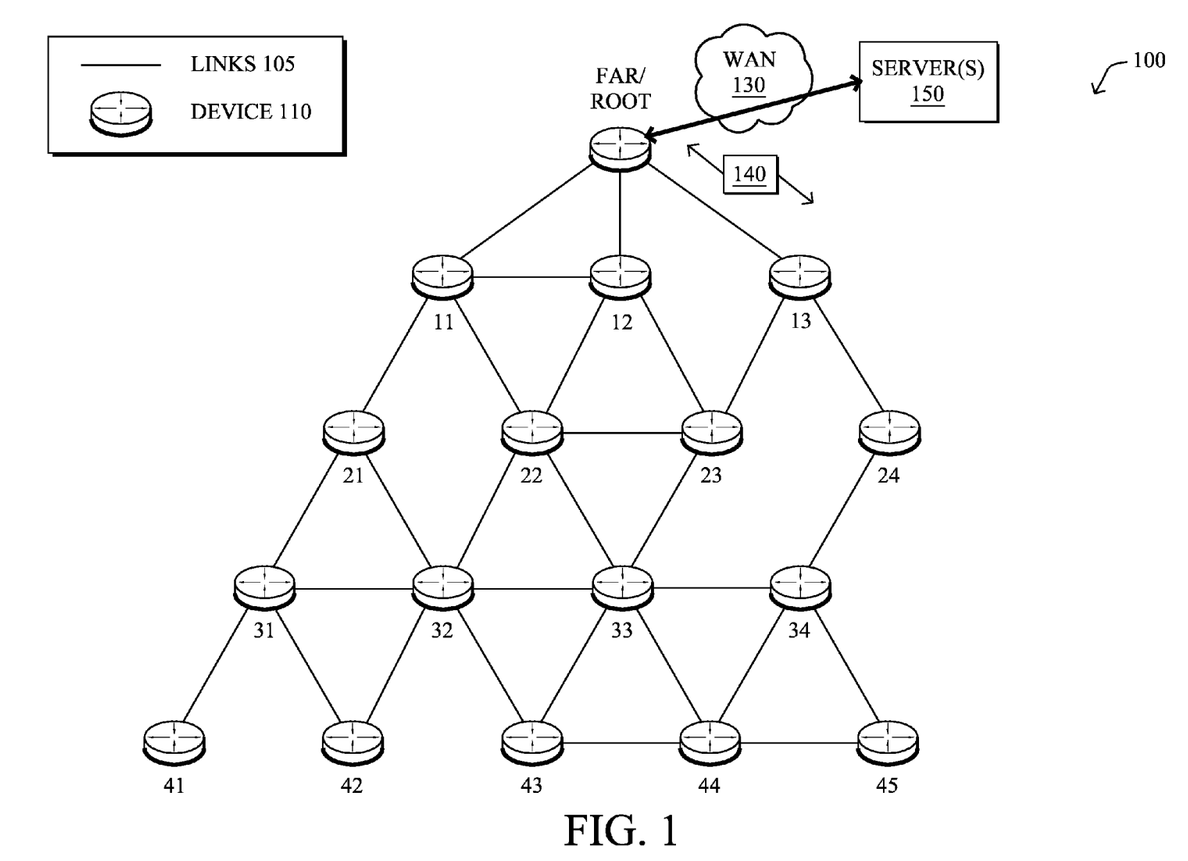
FIG. 1 illustrates an example communication network.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the is nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
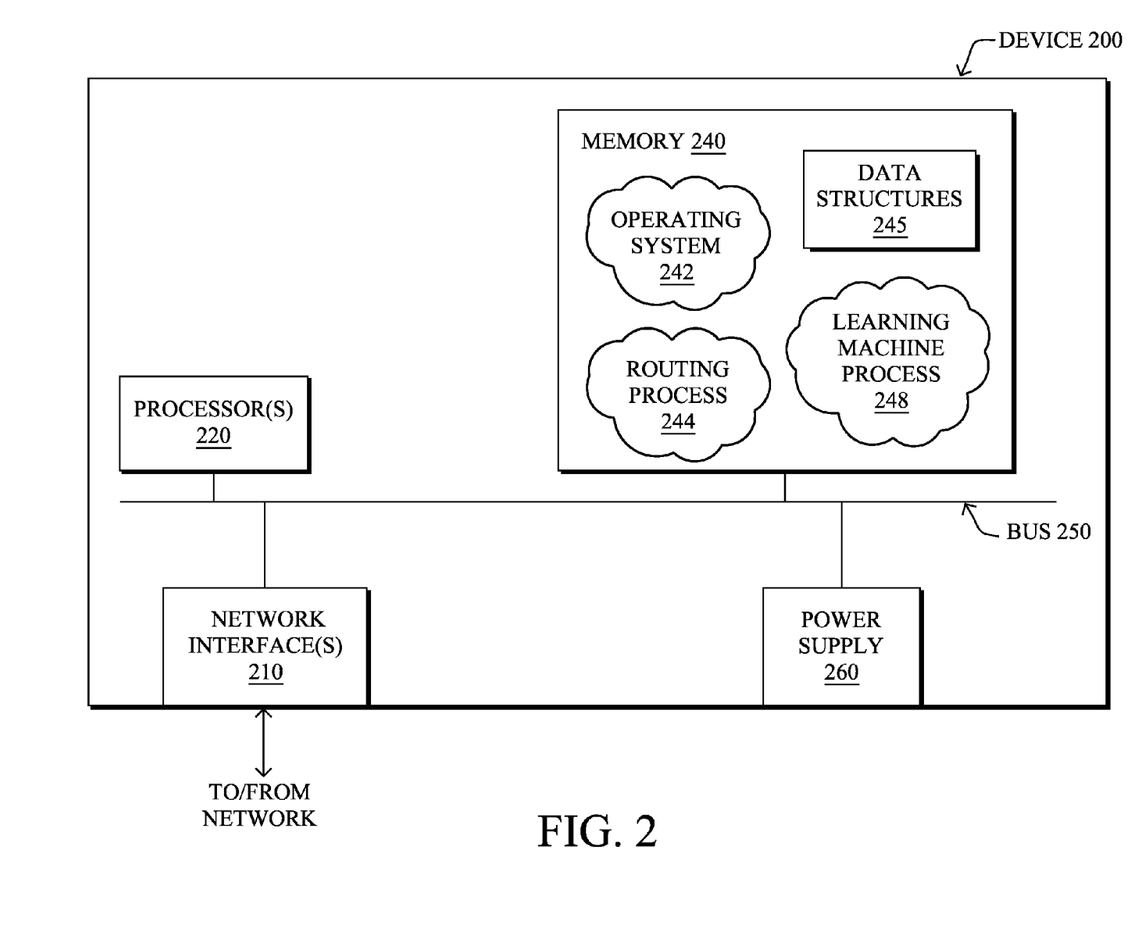
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can is interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is is generally to specify rules on how to build the DAG (e.g. number of parents, backup parents, etc.).

Figure 3:
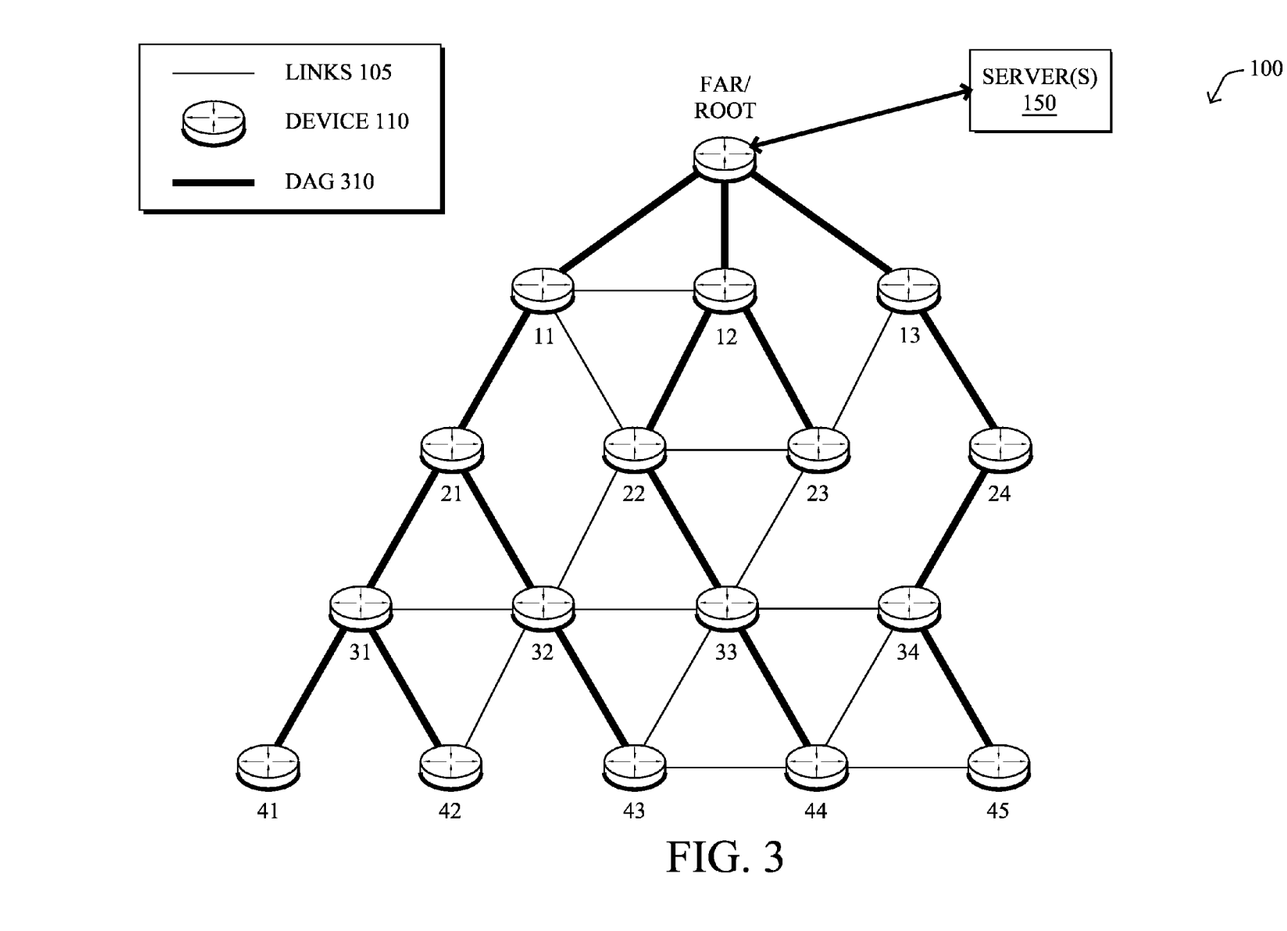
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will is face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

Generally, LM algorithms can be classified into three main categories: (i) unsupervised LMs, (ii) supervised LMs, and (iii) reinforcement learning. Unsupervised LMs can operate completely autonomously without human intervention: they generally tackle tasks such as clustering or dimensionality reduction, which consist in finding hidden structure or patterns in data. Supervised LMs require the input of an expert, generally in the form of labeled data. For the purposes of the present disclosure, an expert, or external expert, may also be referred to as a "user." For instance, when dealing with classification, the LM will first require training data with correct labels for adjusting (i.e., learning) what are the various relevant properties corresponding to each category. Once this step is completed, the LM can classify new input samples in an autonomous fashion. Reinforcement learning is a different type of LM, which lies in between supervised and unsupervised learning. In this case, the LM adjusts a policy so as to maximize the reward obtained by its actions. This reward may or may not be defined by an external expert.

When LMs are in use, the LM constantly monitors the state of the system and runs its algorithm for classification, clustering, etc. Several scenarios may arise where an LM algorithm might not know how to categorize a certain set of network data, e.g., state values, that it has observed or it might not know how good its performance is with respect to a given task. Such scenarios may occur during the initial enablement of an algorithm (e.g., the LM has not yet gathered a sufficient amount of information/knowledge to perform its tasks), occurrence of corner cases or sudden network events leading to unexpected behavior, or they may be an intrinsic requirement of the algorithm. In such a situation, an algorithm could incorrectly classify this event, leading to noise in its knowledge and/or further incorrectness, or, based on its prior knowledge, might not know how to react. It is possible to ask the system for more information using active methods such as pings and probes, however, this technique would not yield much information when the algorithm does not have much information about the state of the system.

The techniques herein, therefore, help the LM when using supervised or, in some cases, reinforcement learning, and aid the LM in inferring the state values being presented to it by the running system. In particular, the techniques herein propose a mechanism whereby an LM can create an on-the-fly tunnel/connection to a human entity for supervision when it encounters states that it has difficult in categorizing.

Said differently, there are a number of circumstances where a LM may not be able to perform its task: the amount of accumulated information/knowledge is not sufficient, the level of confidence provided by the algorithm in use by the LM falls below some low-level threshold, a new type of network event is taking place, etc. The techniques herein dynamically establish a machine-to-human "dialogue" in order to temporarily assist the learning machine, e.g., in recognizing received network data and classifying different types of events. This will be done using an architecture where experts will be reachable according their level and area of expertise. Whenever the LM will encounter a situation needing expert input, it will create a channel to correspond with registered experts. As time progresses, the LM will also learn to pick experts intelligently and will do so by taking educated decisions based on the kind of state it observes. The last component consists in providing feedback to the NMS on the quality of the human intervention for dynamic handling of future requests.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and is as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, as mentioned above, the techniques herein proposes a mechanism where human expertise is used as an input to make the knowledge inferred from the current state of the system richer. In one embodiment, network data is received at a Learning Machine (LM) in a network. It is determined whether the LM recognizes the received network data based on information available to the LM. When the LM fails to recognize the received network data: a connection to a central management node, e.g., NMS, is established, a request is sent for information relating to the unrecognized network data to the central management node, and information is received from the central management node in response to the request. The received information assists the LM in recognizing the unrecognized network data.

A first component of the techniques herein consists of the registration phase. Here, the human entities notify the NMS of their presence and register with the NMS to receive queries from the LM for expert opinion. In this step, every human agent that registers, specifies details such as area of expertise, policies for when they should be contacted, criticality of events that should be notified and even billing information (note that supervised learning may be "sold" as a service or may be part of a managed service plan). At the same time, when new LMs are enabled, they register with the NMS and let the NMS know of their requirements. One such requirement can be the expert input of a human entity, which may or may not be satisfied according to policy. Once the NMS receives this requirement from the LM, it shares the details of the human agents so the LM can contact them. Once this registration phase is completed, all the entities know how to reach each other. The NMS has details of all the human agents and vice-versa. To that end, the techniques herein specify a newly defined IPv6 unicast message used for human entities to register to the NMS and for the NMS to provide the list of "helping" is human agents subject to policy. Alternatively, extensions to a protocol such as DHCP may be used for that purpose.

A second component herein involves the actual interaction of all the entities. While the LM is running, state values start to be gathered from the system it is tracking. These values continuously populate the LMs knowledge database. Several situations may arise:

1. The LM can be configured such that a configurable number of first values need to be classified manually using a human input. Essentially, the LM will rely on the human to recognize and create classes of values and then start to classify each incoming value into those classes. After that the LM will eventually take over and continue to classify new values. Such a mechanism is particularly useful when the algorithms don't have any initial state configured.

2. On many occasions, values will be obtained that are stark outliers, and the LM could either treat them as regular data points that will skew the knowledge or it could get expert opinion from a human. In the latter case, the LM may establish a tunnel to the NMS and send relevant information to it. This information could include existing states, the value of the outliers, the classes being used to classify values, etc.

Figure 4:
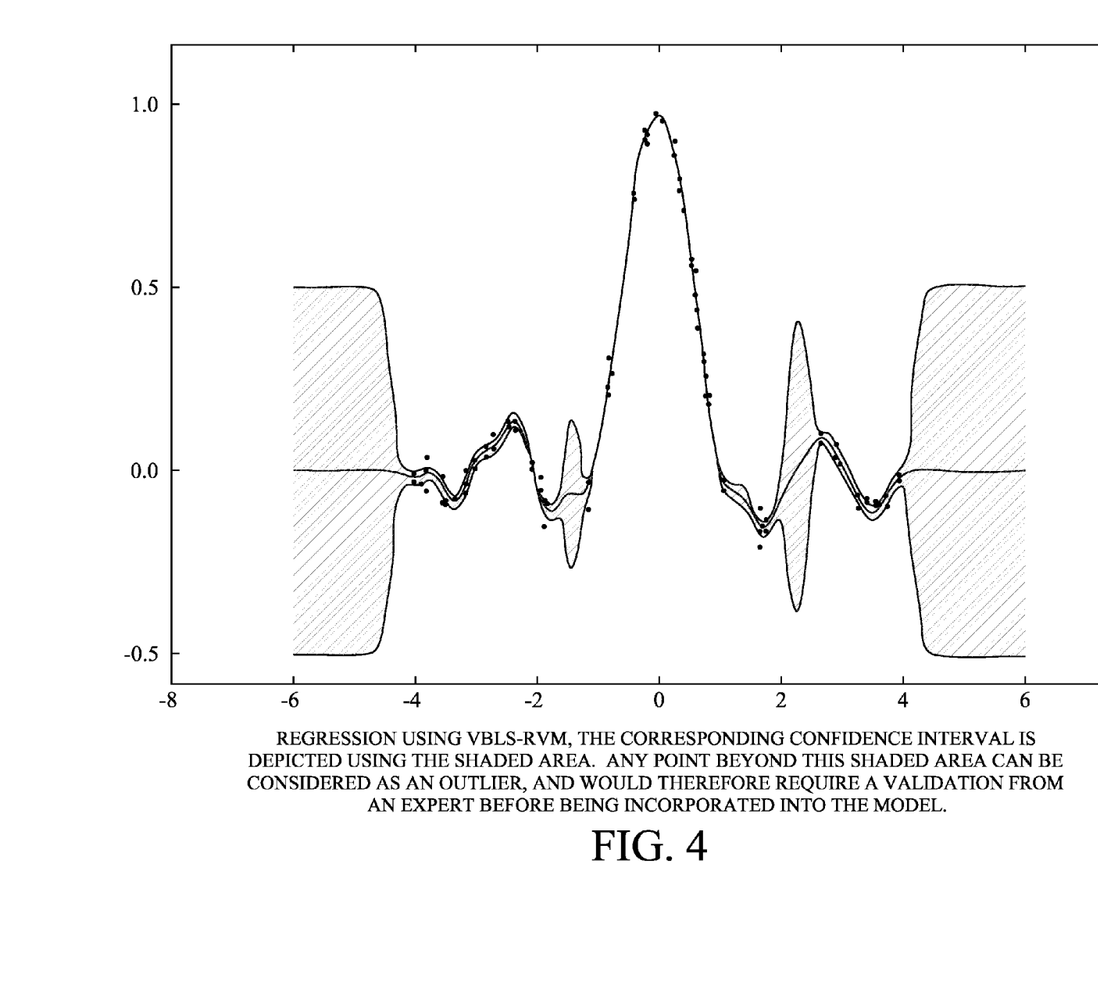
FIG. 4 illustrates an example regression graph.

For instance, in the context of U.S. Provisional Patent Application Ser. No. 61/761,117, entitled "Learning Machine Based Detection of Abnormal Network Performance", filed by Vasseur et al. on Feb. 5, 2013, an algorithm is used called Variational Bayesian Least Squares (VBLS) for estimating the QoS of nodes as a function of their properties (e.g., hop count, ETX, number of children, traffic, etc.). Importantly, VBLS provides an interval of confidence on the estimate $Q_i$ of the QoS of node (see FIG. 4), that is, an interval $[Q_{i,x\%}, Q_{i,(100-x)\%}]$ that captures the expected extrema of nodes, outlier detection can be easily achieved by verifying that any newly measured QoS value $Q_i$ is indeed within this interval.

Upon receiving the request from the LM (e.g., using the newly defined message specified above), the expert can take several actions:

1. Upon being presented with the classes and current state of the system, the is expert can classify the value as a new class of state (such as congestion, failure, security attack, etc.) or as an existing class of state.

2. Alternatively, the expert can ask for more details from the LM. This could be a set of parameters that have been pre-decided to be available. Once this happens, the LM will supply the information requested and could keep continuing to do so till it runs out of any useful information to supply.

Once the LM receives the user input, it will make the following changes in its state:

1. It will start to learn which experts can be contacted for which kind of issues. Together with the policies that it will learn from the NMS, it can be selective with the experts and with the information for which it wants expert opinion.

2. It will start to take the input of the expert into its computations resulting in more accurate knowledge about the state of the network.

3. It will also learn the sequence of steps the expert undertook to reach the conclusion. For illustration, this sequence of steps could be the questions/request for information that the expert asked the LM.

A last component of the techniques herein consists in providing (optional) feed-back to the NMS on the effectiveness of the human interaction to the NMS. To that end a newly defined message is specified that is used by the LM to indicate for each request (or groups of requests) the nature of the issue for which assistance has been required and the number of times a reply has been provided by the human entities. This is useful from several aspects. Firstly, historical information may be maintained that can be referred to such that if similar things were to happen, there is a record of what set of actions and what kind of interpretation the expert undertook. Also, performance and contribution of the experts can be quantified on a regular basis.

Figure 5:
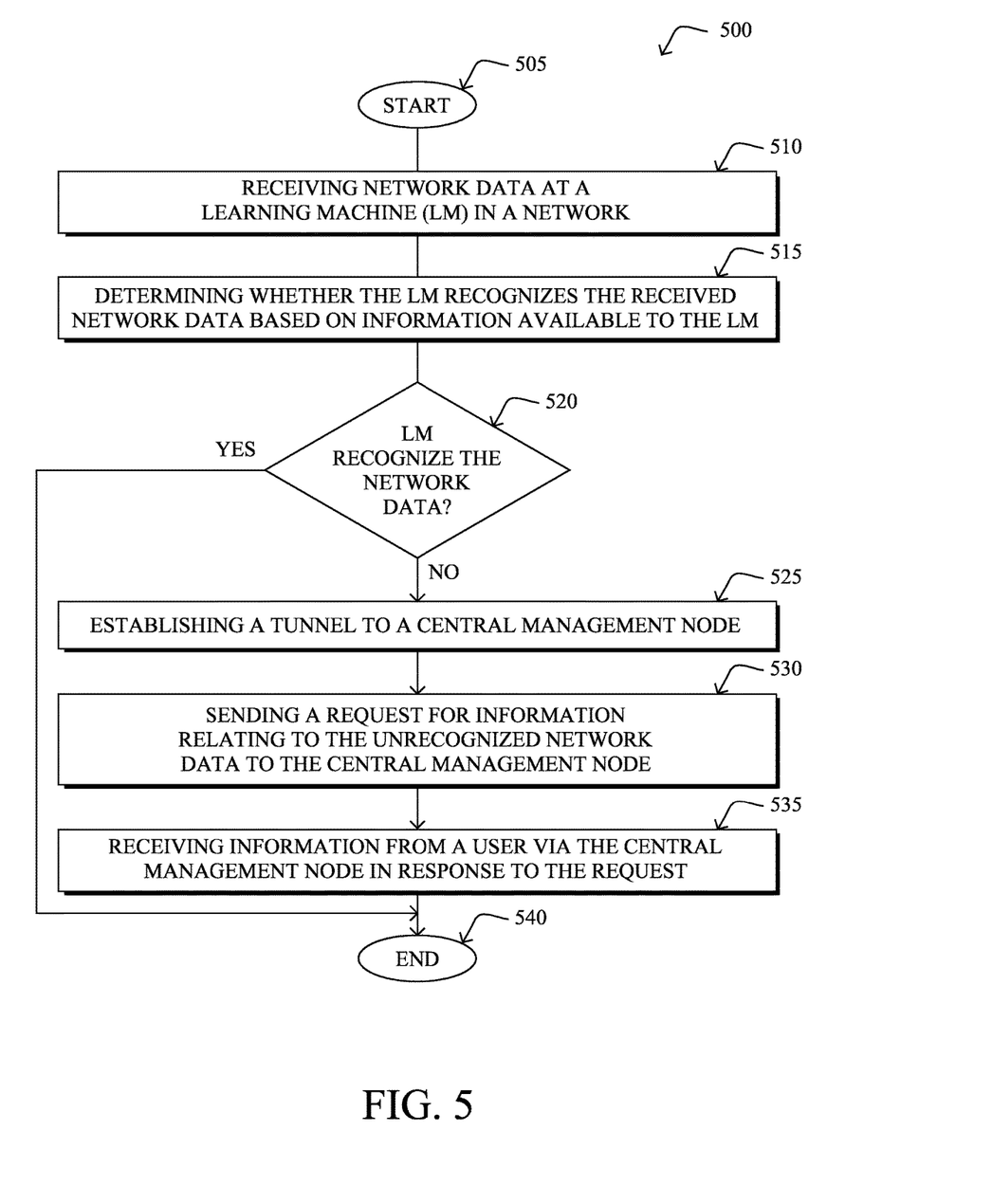
FIG. 5 illustrates an example simplified procedure for triggering on-the-fly requests for supervised learning of learning machines.

FIG. 5 illustrates an example simplified procedure for triggering on-the-fly requests for supervised learning of learning machines. As shown in FIG. 5, the procedure 500 may start at step 505, continue to step 510, and so forth, where, as described in greater detail above, a tunnel connection is established from the LM to a central management node, e.g., NMS, in order to receive additional data from a user, e.g., human expert.

At Step 510, the procedure 500 includes receiving network data at an LM in a network. At Step 515, it is determined whether the LM recognizes the received network data based on information available to the LM. When the LM recognizes the received network data, the procedure 500 continues to Step 540, where the procedure illustratively ends. However, when the LM fails to recognize the received network data (Step 520), the procedure 500 continues to Step 525, where a tunnel connection to a central management node is established. Then, at Step 530, a request for information relating to the unrecognized network data is sent to the central management node. At Step 535, information is received from a user via the central management node in response to the request. The received information assists the LM in recognizing the unrecognized network data. The procedure 500 illustratively ends at Step 540. The techniques by which the steps of procedure 500 are performed, as well as ancillary procedures and parameters, are described in detail above.

It should be understood that the steps shown in FIG. 5 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for triggering on-the-fly requests for supervised learning of learning machines. In particular, the techniques herein allow for human expert input, which greatly increases the efficacy of the LM mechanism (wherein classifications are allowed to be more customizable). Also, outliers can sometimes be detected more easily by experts, than if a LM were to do on its own. As such, the framework relies on the expertise of humans that is gained over years of experience allowing them to discern small but significant variations. Lastly, initial states is for ML algorithms such as VBLS, PCA, HMM, etc. may be obviated (or at least their impact reduced) and may instead be built up solely with the aid of human supervision during the initial stages.

While there have been shown and described illustrative embodiments that provide for triggering on-the-fly requests for supervised learning of learning machines, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   receiving network data at a Learning Machine (LM) in a network;
   determining whether the LM recognizes the received network data based on information available to the LM; and
   when the LM fails to recognize the received network data:
      identifying a user from a list of users on a central management node to request input from according to level and area of expertise of the user,
      establishing an on-the-fly tunnel to the central management node to request input from the identified user to, at least initially, recognize and create classes of values for the received network data,
      sending a request for the input from the user relating to the unrecognized network data to the central management node via the established tunnel, and
      receiving the input from the central management node in response to the request, wherein the received information assists the LM in recognizing and classifying the unrecognized network data.

2. The method according to claim 1, wherein the information is received from a user via the central management node.

3. The method according to claim 1, further comprising:
   including contextual information in the request that relates to one or more of: the unrecognized network data, a state of the network, an identity of the LM, capabilities of the LM, and requirements of the LM.

4. The method according to claim 3, wherein the received information is based on the contextual information.

5. The method according to claim 3, further comprising:
   receiving a request from the central management node to provide additional information relating to one or more of: the unrecognized network data and the contextual information; and
   sending the additional information to the central management node in response to the request.

6. The method according to claim 1, further comprising:
   including in the request an indication of a particular user from which the LM is requesting the information relating to the unrecognized network data.

7. The method according to claim 1, further comprising:
   registering the LM with the central management node.

8. The method according to claim 7, wherein the registering of the LM comprises:
   sending a message to the central management node that includes an indication of one or more of: an identity of the LM, capabilities of the LM, and requirements of the LM.

9. The method according to claim 2, further comprising:
   providing feedback to the central management node relating to the information received from the user.

10. An apparatus, comprising:
    one or more network interfaces that communicate with a network;
    a processor coupled to the one or more network interfaces and configured to execute a process; and
    a memory configured to store program instructions which contain the process executable by the processor, the process comprising:
       receiving network data as a Learning Machine (LM) in the network;
       determining whether the LM recognizes the received network data based on information available to the LM; and
       when the LM fails to recognize the received network data:
          identifying a user from a list of users on a central management node to request input from according to level and area of expertise of the user,
          establishing the on-the-fly tunnel to the central management node to request input from the identified user to, at least initially, recognize and create classes of values for the received network data,
          sending a request for the input from a user relating to the unrecognized network data to the central management node via the established tunnel, and
          receiving the input from the central management node in response to the request, wherein the received information assists the LM in recognizing and classifying the unrecognized network data.

11. The apparatus according to claim 10, wherein the information is received from a user via the central management node.

12. The apparatus according to claim 10, wherein the process further comprises:
    including contextual information in the request that relates to one or more of: the unrecognized network data, a state of the network, an identity of the LM, capabilities of the LM, and requirements of the LM.

13. The apparatus according to claim 12, wherein the received information is based on the contextual information.

14. The apparatus according to claim 12, wherein the process further comprises:
    receiving a request from the central management node to provide additional information relating to one or more of: the unrecognized network data and the contextual information; and
    sending the additional information to the central management node in response to the request.

15. The apparatus according to claim 10, wherein the process further comprises:
    including in the request an indication of a particular user from which the LM is requesting the information relating to the unrecognized network data.

16. The apparatus according to claim 10, wherein the process further comprises:
   registering the LM with the central management node.
17. The apparatus according to claim 16, wherein the registering of the LM comprises:
   sending a message to the central management node that includes an indication of one or more of: an identity of the LM, capabilities of the LM, and requirements of the LM.
18. The apparatus according to claim 11, wherein the process further comprises:
   providing feedback to the central management node relating to the information received from the user.
19. A tangible non-transitory computer readable medium storing program instructions that cause a computer to execute a process, the process comprising:
   receiving network data at a Learning Machine (LM) in a network;
   determining whether the LM recognizes the received network data based on information available to the LM; and
   when the LM fails to recognize the received network data:
      identifying a user from a list of users on a central management node to request input from according to level and area of expertise of the user,
      establishing the on-the-fly tunnel to the central management node to request input by the identified user to, at least initially, recognize and create classes of values for the received network data,
      sending a request for the input from the user relating to the unrecognized network data to the central management node via the established tunnel, and
      receiving the input from the central management node in response to the request, wherein the received information assists the LM in recognizing and classifying the unrecognized network data.
20. The computer readable medium according to claim 19, wherein the information is received from a user via the central management node.

* * * * *

UNITED STATES PATENT AND TRADEMARK OFFICE
CERTIFICATE OF CORRECTION

PATENT NO. : 9,652,720 B2
APPLICATION NO. : 13/937705
DATED : May 16, 2017
INVENTOR(S) : Jean-Philippe Vasseur et al.

It is certified that error appears in the above-identified patent and that said Letters Patent is hereby corrected as shown below:

In the Specification

In Column 1, Line 33, please amend as shown:
of nodes (an order of magnitude larger than a "classic" IP In Column 1, Line 66, please amend as shown:
more complicated regression problems that are usually In Column 3, Line 61, please amend as shown:
exchanged among the nodes/devices of the computer In Column 5, Line 56, please amend as shown:
industrial automation, and cars (e.g., that can interconnect In Column 6, Line 33, please amend as shown:
Objective Function is generally to specify rules on how to In Column 7, Line 8, please amend as shown:
tant, as the network will face changing conditions and In Column 8, Line 26, please amend as shown:
routing process 244), and as such, may be processed by In Column 9, Line 3, please amend as shown:
to provide the list of "helping" human agents subject to In Column 9, Line 44, please amend as shown:
of the system, the expert can classify the value as a new Signed and Sealed this
Twelfth Day of January, 2021

Andrei Iancu
*Director of the United States Patent and Trademark Office*

CERTIFICATE OF CORRECTION (continued)
U.S. Pat. No. 9,652,720 B2

In Column 10, Line 55, please amend as shown:
initial states for ML algorithms such as VBLS, PCA,